United States Patent [19]

Piccolo et al.

[11] 4,050,951

[45] Sept. 27, 1977

[54] PROCESS FOR THE POST-TREATMENT OF TITANIUM DIOXIDE PIGMENTS

[75] Inventors: Luigi Piccolo; Benedetto Calcagno, both of Milan; Emilio Bossi, Fagnano Olona (Varese), all of Italy

[73] Assignee: Societa' Italiana Resine S.I.R. S.p.A., Milan, Italy

[21] Appl. No.: 638,161

[22] Filed: Dec. 5, 1975

[30] Foreign Application Priority Data

Dec. 20, 1974 Italy .................................. 30816/74

[51] Int. Cl.² ................................................ C09C 1/36
[52] U.S. Cl. .................................... 106/300; 427/213; 427/215; 427/255
[58] Field of Search ................. 106/300; 427/213, 215, 427/255

[56] References Cited

U.S. PATENT DOCUMENTS

| 3,537,870 | 11/1970 | Grohmann | 106/300 |
| 3,552,995 | 1/1971 | Powell | 106/300 X |
| 3,640,744 | 2/1972 | Dietz et al. | 106/300 |
| 3,914,473 | 10/1975 | Hale | 427/255 |

FOREIGN PATENT DOCUMENTS

| 1,546,001 | 8/1973 | Germany | 427/255 |
| 6,801,551 | 8/1968 | Netherlands | 427/215 |

Primary Examiner—Patrick P. Garvin
Assistant Examiner—William G. Wright
Attorney, Agent, or Firm—Christie, Parker & Hale

[57] ABSTRACT

Titanium dioxide is post-treated by flowing it in a tubular zone as a suspension in a stream of carrier gas, injecting a gaseous stream of halides of Si, Ti and Al in said stream and then steam in the resulting mixture, once the latter is homogenized.

14 Claims, No Drawings

PROCESS FOR THE POST-TREATMENT OF TITANIUM DIOXIDE PIGMENTS

The present invention relates to a process for the post-treatment of titanium dioxide pigments. One of the white pigments most widely used in industry is titanium dioxide, above all for its excellent properties of covering power and gloss.

Titanium dioxide, which is manufactured commercially either by the sulphate process from titaniferous minerals or slags or by the chloride process from mineral rutile, can be used as a pigment both in its rutile crystalline form and in its anatase form.

Production of one or the other forms is above all dependent upon the treatment agents and upon the conditions of the specific process used.

However, titanium dioxide is also characterized by some properties which are undesirable for a pigment.

In particular, its resistance to the action of light, which from now on will be indicated as photochemical stability, is somewhat limited, and gives rise to color alteration and generally to yellowing of the covering compositions, plastics materials, resins, laminates and the like in which titanium dioxide is incorporated as a pigment.

Similarly the films of paints, varnishes, enamels, lacquers and coverings in general containing titanium dioxide undergo degradation when exposed for a long time to environmental conditions, and this phenomenon is marked by a low resistance to chalking of the pigment. In fact this degradation brings forth on the surface of the films a continuous loss of titanium dioxide in powder form.

In order to make pigments based on titanium dioxide having improved photochemical stability and resistance to chalking, the particles of titanium dioxide, prepared according to one of the known processes, are generally coated with one or more oxides and/or hydroxides.

This coating can be carried out in the art by precipitating hydroxides, normally of aluminum, titanium and silicon, alone or mixed together, upon the particles (granules) of titanium dioxide suspended in an aqueous solution.

In its general lines the process is the following: the titanium dioxide, finely ground, is suspended in water; to this suspension there is added a solution of salts corresponding to the hydroxides which it is wished to precipitate upon the titanium dioxide granules; this is neutralized with solutions of soda or caustic soda or of ammonia, at a temperature normally between 60° and 80° C.

The suspension is then filtered and the coated titanium dioxide is washed, dried and micronised, possibly with the addition of organic substances designed to improve its dispersing power.

For applications which require a particularly high photochemical stability, as in plastic laminates, the post-treated titanium dioxide is subjected to a further second post-treatment, similar to the first, and possibly to a final thermal treatment at a temperature around 600° C.

However this process, known as the "wet" process, has some disadvantages, which make it economically burdensome; in particular, very bulky equipment is required, and moreover the operations, above all precipitation and filtration, are very long and so the treatment is very costly.

For this reason it is desirable to effect a "dry" coating of the pigment with substances applied in a subsequent treatment.

It is already known that a "dry" coating of the pigment particles can be effected, in order to obtain improved characteristics of photochemical stability and resistance to chalking, by precipitation of the coating substance in the vapor phase upon the pigment particles suspended in a fluid bed.

Usually this is achieved by causing the halides, corresponding to the hydroxides to be precipitated, to pass in the vapor state together with steam, in a fluid bed of pigment of titanium dioxide to be coated, at a temperature of the order of 200° C.

In this way hydrolysis of the halides is achieved with formation of the corresponding hydroxides which precipitate upon the surface of the pigment particles.

This method, although it leads to better results than the "wet" method, still has, nevertheless, disadvantages.

In particular, the particles obtained are characterized by a lack of homogeneity in thickness of the coating layers due to the different residence times of the solid particles in the fluid bed; moreover, the formation of agglomerates in the fluid bed is very frequent and therefore it is practically impossible to effect a regular coating of the individual granules. Finally, the coating often shows cracks.

Probably these phenomena are closely dependent upon the fluodynamic characteristics of the said fluid bed. In fact the particles in their continuous movement are subject to frequent recirculations, with collisions and consequent breaking and crushing of the coatings which cover them.

Now we have found a "dry" process for the post-treatment of titanium dioxide pigments, both in rutile and anatase form, which makes possible the elimination of the disadvantages described.

Thus, the invention provides a process for the post-treatment of titanium dioxide pigments, characterized by flowing in an elongated tubular zone a suspension of subdivided particles of titanium dioxide in a stream of carrier gas at a temperature of from 100° to 250° C, injecting into said stream at one or more points along said tubular zone a gaseous flow of one or more halides selected in the group consistint of the halides of aluminum, silicon and titanium in an overall amount corresponding to from 1 to 20% by weight, calculated as oxides, with respect to the feed in titanium dioxide, and injecting, down stream of each point of injection of said gaseous flow at a distance from the latter sufficient to allow homogenization of the resulting mixture therein, a flow of steam in said mixture in an amount of from the stoichiometric value required for the transformation into hydroxides of said halides injected at said point to 50% in excess with respect to said stoichiometric value.

Generally, the finely ground titanium dioxide, usually with a granulation of from 0.1 to 1 microns, is suspended in a stream of warm air so that the suspension reaches a temperature of from 100° to 250° C, this temperature being maintained throughout the treatment.

The choice of temperature depends above all upon the dew point of the feed halides, having to work at values always superior to the higher dew point of the halides used.

In the preferred embodiment of the process according to this invention, one operates with a concentration of titanium dioxide in the suspension of from 5 to 50 Kg of titanium dioxide per m³ of carrier gas under operating conditions, and preferably from 20 to 35 Kg/m³.

The halides are preferably chlorides, and are preferably fed into the tubular zone in an overall amount corresponding to from 2 to 8% in weight calculated as oxides in relation to the feed in titanium dioxide.

The best results for the purposes of this invention are achieved by feeding from 2 to 4% of aluminum trichloride, from 1 to 5% of silicon tetrachloride and from 0.5 to 2% of titanium tetrachloride, calculated as oxides, with respect to the feed in titanium dioxide.

Downstream of this feed, once the homogenization of the chlorides with the titanium dioxide has taken place, there is fed in the resulting mixture, steam in an amount varying from the stoichiometric quantity required for converting the chlorides into hydroxides to 50% in excess of the said stoichiometric quantity.

Under those conditions the hydrolysis reaction is instantaneous and the granules of titanium dioxide will therefore be coated by a thin layer, of the order of a hundredth of a micron, of the immediately precipitated hydroxides.

In practice the process can be carried out in an elongated tubular apparatus to one end of which there is fed the titanium dioxide suspended in a current of hot conveyor air at a temperature from 100° to 250° C, and then one or more chlorides, and downstream, the steam.

The speed of conveyance of the suspension is advantageously of from 2 meters/second to 10 meters/second. Below 2 meters/second, it is difficult to obtain a good pneumatic conveyance of the titanium dioxide, and above 10 meters/second, second, there can be unevenness in the coating of the titanium dioxide granules.

In order to obtain an adequate homogenization of the titanium dioxide and the halides, the distance between the admission point of the halides, singly or mixed, and the subsequent admission point of the steam is preferably regulated so that the latter shall have a value of from 6 to 30 times the average diameter of the tubular zone along said distance, and preferably from 10 to 20 times.

At the outlet end of the tubular zone there is extracted the product coated with the uniform layer of hydroxides corresponding to the fed halides, which product can be separated from the gases in which it is suspended by means of a centrifugal separator or electrostatic filters or mesh filters.

The product is then generally subjected to degassing by heating to 200°-250° C, in a light flow of air, for 1-2 hours, thereby to completely eliminate the hydrochloric acid absorbed on to the particles.

When it is wished to obtain a titanium dioxide pigment of special photochemical stability, as for example for the use of the pigment in plastic laminates, then the post-treated product deriving from the above-described post-treatment is subjected to a further second post-treatment under the conditions of the first post-treatment. This second post-treatment can with advantage be carried out in the same apparatus, in series with the first one, before degassing.

Finally, after degassing, still in the conditions described above, the resulting product is subjected to calcination at a temperature of from 500° to 700° C for a period of 1 to 5 hours.

After this treatment the layer coating the particles of titanium dioxide consists mostly of metal oxides corresponding to the halides used.

According to this invention, when more than one halide is used, apart from their use in mixture, it is also possible to introduce separately each halide along the tubular zone at different admission points. The successive order of introduction can be varied without any substantial changes in the results.

In this case each injection of halide is followed by an injection of steam downstream, according to the conditions previously indicated.

The section of the tubular zone can be kept constant along the whole length of the latter, but it is more advantageous to increase it in the direction of the flow of suspension in correspondence with one or more of the injection points of the lateral flows.

In this way it is possible to keep constant, or almost constant, the speed of the flow within the tubular zone.

In each case the titanium dioxide pigment post-treated according to this invention consists of granules with a coating of uniform thickness, without cracks or aggregates, characterized by high properties of photochemical stability and resistance to chalking.

Further, the process according to the invention also possesses the advantage that it can be effected with an equipment of very limited dimensions, and with operating methods of short duration, simple and inexpensive.

The invention will now be illustrated from the following examples which are not intended in any way to restrict its scope.

EXAMPLE 1

The operation was carried out in a horizontal tubular glass reactor consisting of two portions of different diameter: the first with a 2 cm diameter corresponding to the conveyance of the suspension of $TiO_2$ in air and to the mixing with the chlorides, and the second of a 2.9 cm diameter onwards from the admission point of the steam.

At the inlet end of the reactor there was fed a stream of air dried and preheated to 200° C at a rate of 4.35 m³/h, measured at the temperature of 200° C, and in said stream there was suspended titanium dioxide, having a granulometry of from 0.1 to 1 micron, preheated to 200° C and fed at a rate of 100 Kg/h.

The conveyance speed in the first portion was of 3.8 m/sec.

Then there was introduced in the suspension a mixture of chlorides of Si, Al and Ti in such quantities as to obtain 1.0% of $SiO_2$, 3.0% of $Al_2O_3$ and 1.5% of $TiO_2$ with respect to the feed in $TiO_2$ pigment. The conveyance speed was thus increased to 6 m/sec. After a mixing length of the chlorides with the $TiO_2$ equal to 45 cm, steam was fed in the stoichiometric quantity required for complete hydrolysis of the chlorides. The conveyance speed after reaction of the steam with the chlorides was of 7.0 m/sec.

After a length of mixing and reaction equal to 45 cm, in which there was achieved the coprecipitation of the hydroxides of silicon, aluminum and titanium on the titanium dioxide, the solid phase was separated by means of a centrifugal separator and a mesh filter and then degassed in a vertical reactor with a light flow of air at 200° C for 1.5 hours.

The product obtained, examined under the electron microscope, showed a very homogeneous coating by the hydroxides.

As a test for determining the resistance to light and to chalking there was prepared, with the titanium dioxide obtained, a painting of glycerophthalic alkyl resin SI- RALCHID 2256(R.T.M.) with a concentration of pigment in volume equal to 25%. On a test piece treated with this paint the gloss was determined with the Gardner gloss-meter (Physical and Chemical Examination — Paints, Varnishes, Lacquers, Colours — Gardner-Sward 12 Ed. 1962 pp. 85–86) before and after heating at 200° C for various periods of time.

The following results were found:

| Test piece | Gloss |
| --- | --- |
| Initial | 95 |
| after 12 hours of heating | 94 |
| after 24 hours of heating | 93 |
| after 48 hours of heating | 91 |

EXAMPLE 2

In the same apparatus as in Example 1, furnished however with an inlet for the admission of $SiCl_4$ in the portion of 2 cm diameter, there was fed at 200° C a suspension consisting of 100 Kg/h of $TiO_2$ in 4.35 m³/h of dried air, calculated at 200° C. To this suspension, on the 2 cm diameter portion of tubing, there was fed $SiCl_4$ in a quantity corresponding to 1% of $SiO_2$ in relation to the feed in $TiO_2$ and after a length equal to 30 cm, still in the same tubing portion, steam was fed in the stoichiometric quantity required for hydrolizing the $SiCl_4$.

As a result, the speed of conveyance passed from an initial value of 3.8 m/sec to a final value of 6.1 m/sec.

After a length of reaction equal to 30 cm, in which there occurred precipitation of the silicon hydroxide on the $TiO_2$, there was fed a gaseous mixture of $AlCl_3$ and $TiCl_4$ in quantities corresponding respectively to 3.0% of $Al_2O_3$ and 1.5% of $TiO_2$ with respect to the feed in $TiO_2$. From the admission point of these two chlorides the piping had a diameter equal to 2.9 cm and the speed of conveyance was 3.7 m/sec.

After a length of mixing of these chlorides with $TiO_2$ equal to 45 cm, steam was fed in the stoichiometric quantity required for complete hydrolysis of the said chlorides. As a result, the speed of conveyance passed to 7 m/sec. After a length of mixing and reaction equal to 45 cm, in which there was effected coprecipitation of the hydroxides of aluminum and titanium on the titanium dioxide already coated with silicon hydroxide, the solid phase was separated from the gaseous one by means of a centrifugal separator and a mesh filter, and then degasses as in Example 1.

Under electron microscope examination the coating of titanium dioxide was homogeneous.

The test for determining the resistance to light and to chalking was carried out as in Example 1.

The following results were found:

| Test piece | Gloss |
| --- | --- |
| Initial | 96 |
| after 12 hours of heating | 94 |
| after 24 hours of heating | 93 |
| after 48 hours of heating | 92 |

EXAMPLE 3

A double post-treatment test was carried out in which the first post-treatment was carried out in the same way as in Example 1; the $TiO_2$ coated, with the coprecipitated hydroxides of silicon, aluminum and titanium, however, was not separated from the gaseous phase but there was further added to the gaseous suspension, a gaseous mixture of chlorides of Si, Al and Ti in such quantity as to obtain a further coprecipitation of the corresponding hydroxides in amounts equal to 0.5% of $SiO_2$, 1.5% of $Al_2O_3$ and 0.75% of $TiO_2$ in relation to the feed in $TiO_2$ pigment. From the point of introduction of this mixture of chlorides the piping had an inner diameter equal to 3.2 cm, and the conveyance speed was of 6.2 m/sec. After a mixing length equal to 50 cm steam was fed in the stoichiometric quantity for hydrolysis of the chlorides and the conveyance speed became equal to 8 m/sec.

After a mixing and reaction section of 50 cm the solid phase was separated from the gaseous phase by means of a centrifugal separator and a mesh filter.

Under electron microscope examination there was noted a perceptible thickening of the coating layer.

At the gloss test the following values were found:

| Test piece | Gloss |
| --- | --- |
| Initial | 93 |
| after 12 hours of heating at 200° C | 92.5 |
| after 24 hours of heating at 200° C | 92.5 |
| after 48 hours of heating at 200° C | 92 |

EXAMPLE 4 (COMPARATIVE)

For comparison a post-treatment was carried out according to a conventional "wet" method. The finely ground titanium dioxide was suspended in water with a concentration of 200 g/l in the presence of 0.1 gr/l of sodium hexamethaphosphate as dispersing agent. Under agitation at a temperature of 60° C there were added successively sodium silicate, aluminum sulphate and titanium sulphate in quantities such as to give rise to 1% $SiO_2$, 3% $Al_2O_3$ and 1.5% $TiO_2$ in relation to the feed in $TiO_2$ pigment. The resulting solution was then brought to pH 7.5 by addition of a NaOH solution.

The slurry was filtered and the titanium dioxide washed, dried and micronized.

Under electron microscope examination the coating was much more heterogeneous than in the previous Examples.

The following values were found at the gloss test:

| Test piece | Gloss |
| --- | --- |
| Initial | 93.5 |
| after 12 hours of heating at 200° C | 91 |
| after 24 hours of heating at 200° C | 88 |
| after 48 hours of heating at 200° C | 85 |

EXAMPLE 5 (COMPARATIVE)

In an apparatus of the fluidized bed type having an inner diameter of 5 cm and provided at the bottom of the bed with two inlets for the introduction of the gaseous chlorides and of the steam, respectively, titanium dioxide of the type used in the preceding examples, was loaded and fluidized with dried air fed at a rate of 350 l/h at 200° C, reaching a height of 20 cm. Then there was fed during a half-hour period, a mixture of chlorides of Si, Al and Ti in quantities corresponding to 1.0% of $SiO_2$, 3.0% of $Al_2O_3$ and 1.5% of $TiO_2$ in relation to the charge in $TiO_2$ pigment and at the same time a quantity of steam such as to hydrolize the chlorides. In the course of the test the titanium dioxide did not remain divided, but agglomerated into tiny balls kept in fluidization. The product was discharged after the half-hour treatment and was degassed as in Example 1.

Under the electron microscope examination the coating was wholly uneven in distribution, and the gloss test gave the following values:

| Test piece | Gloss |
|---|---|
| Initial | 94 |
| after 12 hours of heating at 200° C | 89 |
| after 24 hours of heating at 200° C | 85 |
| after 48 hours of heating at 200° C | 78 |

We claim:

1. A method for the post-treatment of titanium dioxide pigments, which comprises flowing in an elongated tubular reaction zone a suspension of subdivided particlces of titanium dioxide of a size from about 0.1 to 1 micron in a stream of carrier gas in which particle concentration is from 5 to 50 Kg per m$^3$ of carrier gas at a temperature of from 100° to 250° C, injecting into said stream at one or more points along said tubular reaction zone a gaseous flow of one or more halides selected from the group consisting of the halides of aluminum, silicon and titanium in an overall amount corresponding to from 1 to 20% by weight, calculated as oxides, with respect to the feed in titanium dioxide, and injecting, downstream of each point of injection of said gaseous flow at a distance from the latter sufficient to allow the homogenization of the resulting mixture therein, a flow of steam in said mixture in an amount of from the stoichiometric value required for the transformation into hydroxides of said halides injected at said point to 50% in excess with respect to said stoichiometric value.

2. A method for the post-treatment of titanium dioxide pigments, which comprises flowing in an elongated tubular reaction zone a suspension of subdivided particles of titanium dioxide in a stream of carrier gas at a temperature of from 100° to 250° C, injecting into said stream at one or more points along said tubular reaction zone a gaseous flow of one or more halides selected from the group consisting of the halides of aluminum, silicon and titanium in an overall amount corresponding to from 1 to 20% by weight, calculated as oxides, with respect to the feed in titanium dioxide, and injecting, downstream of each point of injection of said gaseous flow at a distance from the latter sufficient to allow the homogenization of the resulting mixture therein, a flow of steam in said mixture in an amount of from the stoichiometric value required for the transformation into hydroxides of said halides injected at said point to 50% in excess with respect to said stoichiometric value.

3. The method of claim 2, wherein said carrier gas is air.

4. The method of claim 2, wherein the concentration in titanium dioxide in said suspension is of from 20 to 35 Kg per m$^3$ of carrier gas.

5. The method of claim 2, wherein said overall amount of halides corresponds to from 2 to 8% by weight, calculated as oxides, with respect to the feed in titanium dioxide.

6. The method of claim 2, wherein said halides are chlorides.

7. The method of claim 6, wherein said chlorides are injected in an overall amount of aluminum trichloride of from 2 to 4%, of silicon tetrachloride of from 1 to 5% and of titanium tetrachloride of from 0.5 to 2%, calculated as oxides, with respect to the feed in titanium dioxide.

8. The method of claim 2, wherein said suspension is flowed at a speed of from 2 to 10 m/sec.

9. The method of claim 2, wherein aluminum chloride, silicon chloride and titanium chloride are injected separately at different injections points.

10. The method of claim 2, wherein said tubular zone has a constant cross-section.

11. The method of claim 2, wherein the cross-section of said tubular zone is increased in the direction of flow of the suspension in correspondence with one or more of the injection points of said gaseous flow and steam flow.

12. The method of claim 2, wherein said distance is of from 6 to 30 times the average diameter of the tubular zone along said distance.

13. The method of claim 2, wherein the post-treated titanium dioxide is degassed by heating at 200°–250° C in a light flow of air for a period of 1 to 2 hours.

14. The method of claim 13, wherein said degassed titanium dioxide is calcined at a temperature of from 500° to 700° C for a period of from 1 to 5 hours.

* * * * *

UNITED STATES PATENT AND TRADEMARK OFFICE
CERTIFICATE OF CORRECTION

PATENT NO. : 4,050,951
DATED : September 27, 1977
INVENTOR(S) : LUIGI PICCOLO, BENEDETTO CALCAGNO, EMILIO BOSSI It is certified that error appears in the above-identified patent and that said Letters Patent are hereby corrected as shown below:

Column 2, line 46, for "consistint" read -- consistent --. Column 3, line 33, after "second," delete -- second, --. Column 7, line 19, for "particlces" read -- particles --.

Signed and Sealed this

Twenty-first Day of February 1978

[SEAL]

Attest:

RUTH C. MASON
Attesting Officer

LUTRELLE F. PARKER
Acting Commissioner of Patents and Trademarks